Patented Aug. 13, 1935

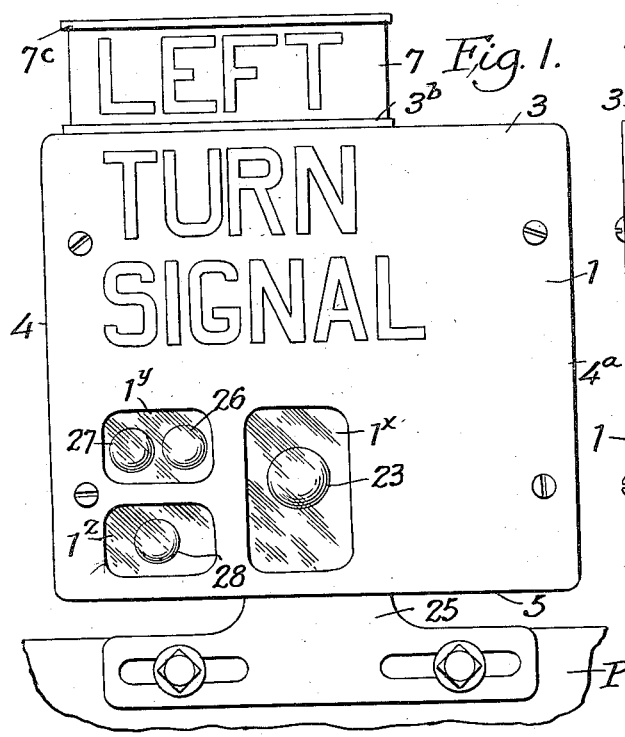
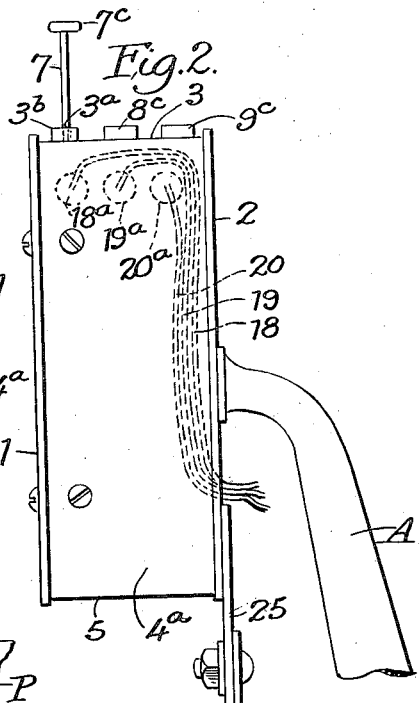
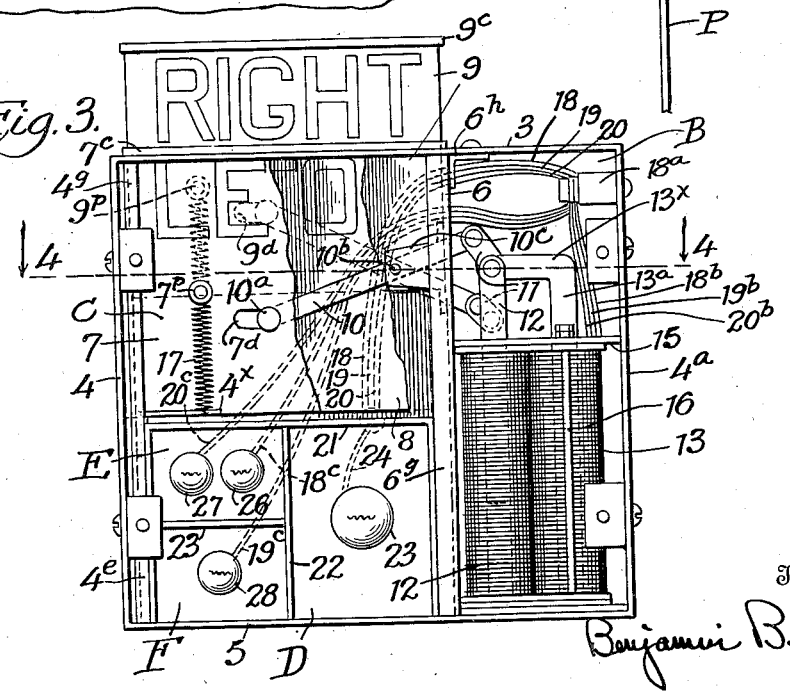

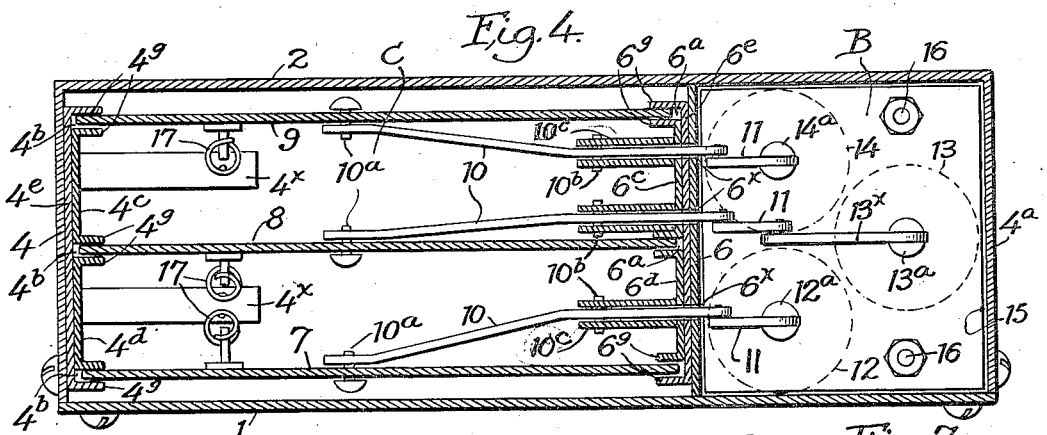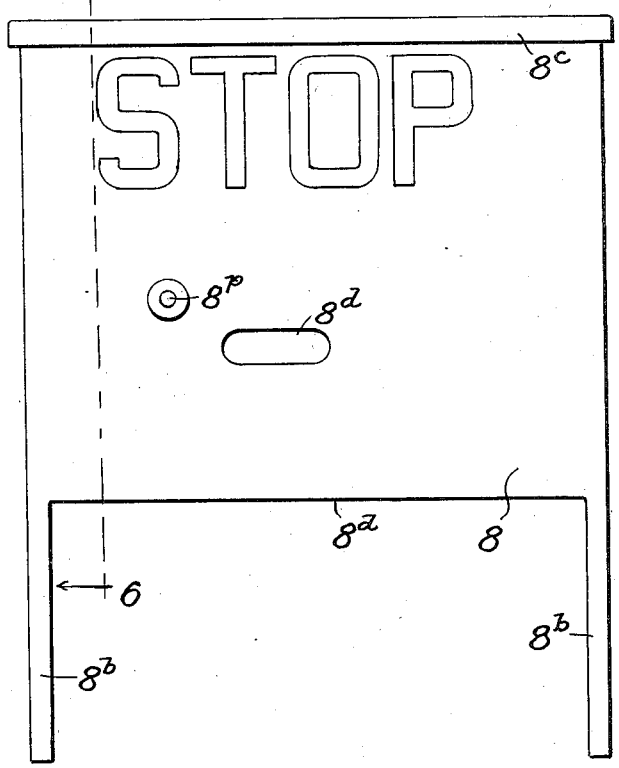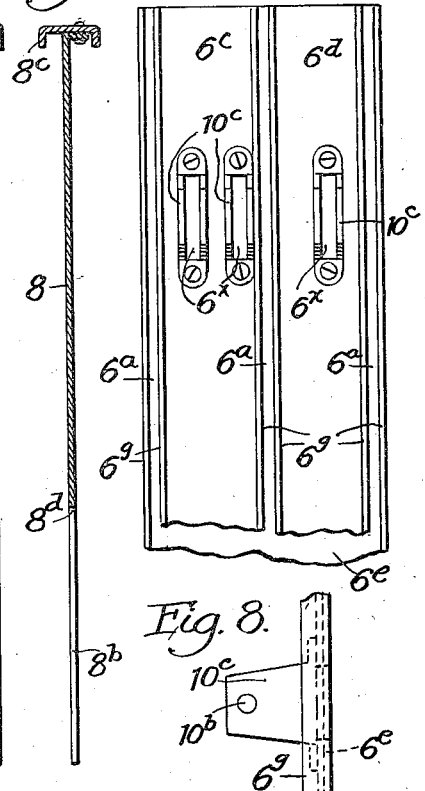

2,011,466

UNITED STATES PATENT OFFICE 2,011,466

TURN AND STOP SIGNAL

Benjamin B. Beach, Battle Creek, Mich.

Application April 30, 1934, Serial No. 723,268

7 Claims. (Cl. 177—327)

This invention is a novel improvement in turn and stop signals of the type shown in my U. S. Letters Patent No. 1,848,927, dated March 8, 1932, in which patent the signal is designed for mounting on road vehicles equipped with a battery or other means of supplying an electric current for lighting or other purposes, said signal consisting of a casing with a plurality of slidable indicia bearing plates adapted to be projected out of slots in the casing by means of solenoids connected in the battery circuit to warn the operators of following or adjacent vehicles that a "Right" turn, "Left" turn, or "Stop", is about to be executed.

The principal objects of the present invention are to provide novel improvements in the construction of the casing, indicia bearing plates, and other parts thereof; also to provide colored light compartments in the casing having colored lamps associated with their respective solenoid circuits, whereby when a particular display plate is projected from the casing its related light compartment will be illuminated to simultaneously display an amber or red light with the projection of the "Stop" plate; and green lights simultaneously with the projection of the "Right" or "Left" turn plates, the casing in addition containing the usual tail light compartment and bracket for the rear license plate.

Another object is to provide a signal of the above type which is simple in construction, positive in operation, durable, and which may be readily attached to a vehicle and connected in the battery circuit.

I will explain the invention with reference to the accompanying drawings which illustrates one practical embodiment thereof to enable others to adopt and use the same; and will summarize in the claims the novel features of construction, and novel combinations of parts, for which protection is desired.

In said drawings:—

Fig. 1 is a front elevation of the signal showing one of the indicia plates projected above the top plate of the casing into position for indicating a "left turn".

Fig. 2 is a side elevation of the casing shown in Fig. 1.

Fig. 3 is a view similar to Fig. 1 with the front plate of the casing removed and portions of the lowered indicia plates broken away, and showing the "left turn" indicia plate in lowered position, and another indicia plate projected to indicate a "right turn".

Fig. 4 is a horizontal section on the line 4—4, Fig. 3.

Fig. 5 is a plan of one of the indicia plates, detached.

Fig. 6 is a section of the line 6—6, Fig. 5.

Fig. 7 is a front elevation of the bearing blocks.

Fig. 8 is a side elevation of the bearing blocks.

My improved turn and stop signal is adapted to be mounted by means of a suitable bracket A on an automobile or other vehicle in position to be readily seen by operators of other vehicles particularly those in rear thereof, the signal consisting of a substantially rectangular casing closed on all of its faces, and having a front plate 1, rear plate 2, top 3, side plates 4, 4a, and bottom plate 5. The casing however may be of any other desired shape.

On side plate 4 are three vertical guides 4b (Fig. 4); and within the casing between the side walls 4, 4a is an opposed plate 6 also carrying three vertical guides 6a (Figs. 4 and 9), the guides 4b, 6a being adapted to slidably receive the ends of indicia bearing plates 7—8—9 adapted to be partially projected through their related slots 3a into display position above the top of the casing, as hereinafter described. Preferably the near plate 7 (Fig. 3) bears the indicia or legend "Left"; the middle plate 8 bears the indicia "Stop"; and the far plate 9 (Fig. 3) bears the indicia "Right", so that when any one of the plates 7—8—9 are projected above the casing as indicated in Figs. 1—2—3, the operators of adjacent vehicles will be warned of a turn or stop, according to the particular plate projected.

The plate 6 divides the interior of the casing into a solenoid compartment B (Fig. 3) on one side; and on the other side into a plate compartment C, the lower end of compartment C being further divided into light compartments D, E and F as hereinafter explained.

The guides 4b on side plate 4 are preferably formed by mounting spaced plates 4c, 4d (Fig. 4) on a third plate 4e of greater width than plates 4c, 4d; the three plates each having their side edges flanged as at 4g to form troughs between the adjacent flanges. The assembly of plates 4c, 4d, 4e may be secured to the side plate 4 in any desired manner. Guides 6a of plate 6 are similarly formed by mounting two spaced narrow plates 6c, 6d (Figs. 4 and 7) on a plate 6e of greater width than plates 6c, 6d; the three plates each having their side edges flanged as at 6g to form troughs between adjacent flanges. Plate 6 is mounted in the casing by means of angle clips 6h (Fig. 3) secured to the casing plates.

Display plate 8 bearing the legend "Stop" (Figs. 5 and 6) is preferably made of aluminum, of width to suit the spacing of the guides 4b, 6a. The height of plate 8 is somewhat less than the height of the casing. The lower portion of plate 8 in way of the compartments E and F is cut away, as at 8a, leaving two narrow guide extensions 8b at opposite sides of the plate to maintain the plate in vertical position when the plate is projected from the casing as shown in Figs. 1 and 2. Each of the other plates 7 and 9 are constructed identically the same as plate 8 except for the legends carried thereon.

Along the upper edge of each plate 7—8—9 is an inverted U-shaped head 7c—8c—9c adapted to cover its related slot 3a when the plate is in lowered position shown in Fig. 3, the heads being adapted to embrace upwardly turned lips 3b formed around the slots 3a (Fig. 2) to prevent dirt and water from entering the top of the casing.

Adjacent the lower edge of the body portion of each plate 7—8—9 is an elongated slot 7d—8d—9d disposed parallel with the lower edge, each slot being adapted to receive a pin 10a on a rocker arm 10 pivoted as at 10b (Figs. 3 and 4) on bearing blocks 10c (Figs. 4, 7, 8) on the guide plate 6c, 6d, said arms 10 extending through openings 6x in the plates 6c, 6d, 6e and 6 into the solenoid compartment B. The opposite end of each rocker arm 10 is connected by a link 11 to the upper ends of the soft iron cores 12a, 13a, 14a of their respective solenoid coils 12, 13, 14, fixedly mounted within the compartment B of the casing.

In order that the casing may have a minimum thickness I preferably arrange the three solenoids 12, 13, 14 in closely adjacent staggered relation as shown in Fig. 4, two solenoid coils 12 and 14 being disposed side by side adjacent the plate 6, and the third solenoid coil 13 adjacent both coils 12 and 14. The core 13a has an offset head 13x extending towards and terminating in the vertical plane of the axes of cores 12a—14a, and head 13x is connected by link 11 with the arm 10 operating the central signal plate 8 bearing the indicia "Stop". Preferably the three coils are in the compartment B by means of a plate 15 of substantially the same area as compartment B and covering the tops of the coils, the plate 15 having openings therein for the respective solenoid cores 12a—13a—14a and the plate being secured to the bottom of the compartment by through bolts 16. The indicia plates 7, 8, 9 are normally yieldably maintained retracted into the casing by means of springs 17 having one end attached to the plates by means of pins 7b—8b—9b, the other end secured to a tongue 4x struck out from the guide plates 4c—4d (Fig. 4), the springs consequently also normally maintaining the solenoid cores 12a—13a—14a in raised positions through their respective arms 10.

By the above construction, when any of the solenoids 12, 13, 14 are electrically excited its related core 12a—13a—14a will be drawn downwardly by magnetic action thereby lifting its related plate 7—8—9 through its casing slot 3a into display position. The electric current for operating the solenoids is supplied by positive wires 18—19—20 from the vehicle battery through suitable switch mechanisms (not shown) on the steering wheel or instrument panel in the usual manner. From said switch mechanisms the wires 18—19—20 extend through contacts 18a—19a—20a (Figs. 2—3) to the solenoids 12—13—14 through wires 18b—19b—20b (Fig. 3), then passes through the solenoid coils and is grounded to the vehicle frame, causing a magnetic flux to be set up in the excited solenoid 12, 13 or 14. The magnetic flux, which exerts a pull on the soft iron core, draws said core down into the solenoid causing its related arm 10, which is fastened to the indicia plate, to lift the plate out of the slot 3a in the top of casing, thereby displaying the signal and warning persons in the rear of or adjacent said vehicle of the intention to make a "Right" or "Left" turn, or to "Stop". When the current is broken at the switch, the magnetic flux collapses and the weight of indicia plate plus the pull of spring 17 overcomes the weight of the soft iron core and the plate drops again into the casing.

The bottom of the plate compartment C of the casing is closed by a horizontal plate 21 extending from end plate 4 to plate 6. A vertical wall 22 divides the compartment below plate 21 into a tail light compartment D; and a horizontal wall 23 divides the space at the side of wall 22 opposite frame compartment D into an upper turn-light compartment E and a lower stop-light compartment F.

In the front plate 1 of the casing opposite tail light compartment D is a red lens 1x; and opposite turn-light compartment E is a colored lens 1y, preferably green; and opposite stop-light compartment F is a colored lens 1z, preferably amber or red.

Within compartment D is a tail light bulb 23 connected by wire 24 with the battery of the vehicle and is lighted whenever the light switch is "On". The bottom of compartment D has an opening so that bulb 23 may also illuminate the license plate D carried by the bracket 25.

In compartment E are two bulbs 26—27 connected by positive wires 18c—20c, to the binding posts 18a—20a (Figs 1—2) in the upper part of compartment B, to which binding posts are likewise connected the positive wires of the solenoid coils 12 and 14 operating the "Left" and "Right" turn plates 7 and 9. Similarly a light bulb 28 in compartment F is connected by positive wire 19c to the binding post 19a in compartment B to which post is also connected the positive wire of coil 13 operating the "Stop" plate 8. Each bulb 26—27—28 is grounded to the casing. By the above construction each time "Stop" plate 8 is displayed by exciting the solenoid 13, the red light bulb 28 is simultaneously lighted in compartment F; and each time the "Left" or "Right" turn plate 7 or 9 is displayed by exciting the solenoids 12—14, a green light bulb 26 or 27 is simultaneously lighted in compartment E.

I claim:—

1. In a signal casing of the character specified having a series of parallel slots in its upper face; indicia bearing slides adapted to be partly projected through said slots out of the casing to display the indicia; means in the casing for actuating the slides; and vertical guides in the casing below the ends of the slots, each guide comprising a base plate having its edges flanged to embrace the outermost slots, and a plurality of narrower spaced plates mounted on the base plate and having their edges flanged, the spaces between the outer flanges of the narrower plates and the adjacent flanges of the base plate, and the spaces between the inner flanges of the narrower plates, forming troughs for receiving the ends of the slides.

2. A signal of the character specified, comprising a rectangular casing having a series of parallel slots in its upper face adjacent one side; a vertical partition within the casing below the inner end of the series dividing the casing into a slide compartment and a compartment for receiving the slide actuating means; slides in the slide compartment bearing indicia and adapted to be partly projected through the slots out of the casing to display their indicia; guides for said plates mounted on the partition; the guides being pre-assembled on the partition pivoted rocker arms engaging the plates and pivoted on and extending through the partition into the compartment for the actuating means; cores on the rocker arms; and solenoid coils mounted in the compartment for the actuating means for operating their respective cores, the coils being arranged in closely adjacent formation whereby a minimum spacing between the slides may be maintained.

3. In a signal as set forth in claim 2, each guide comprising a base plate having its edges flanged to embrace the outermost slots; and a plurality of narrower spaced plates mounted on the base plate and having their edges flanged, the spaces between the outer flanges of the narrower plates and the adjacent flanges of the base plate and the space between the inner flanges of narrower plates, forming troughs for receiving the ends of the slides.

4. In a signal as set forth in claim 2, bearing blocks mounted on the partition adjacent the guides; the bases of the blocks having openings therein registering with openings in the partition through which the rocker arms extend; and pivot pins transfixing the blocks and the arms.

5. A signal of the character specified, comprising a rectangular casing having a series of parallel slots in its upper face adjacent one side; a vertical partition in the casing below the inner end of the series dividing the casing into a plate compartment and a solenoid compartment; slides in the slide compartment bearing indicia and adapted to be partly projected through the slots out of the casing to display their indicia; guides for said plates; pivoted rocker arms engaging the plates and pivoted on and extending through the partition into the solenoid compartment; cores on the rocker arms; solenoid coils mounted in the solenoid compartment for depressing their respective cores and lamp compartments disposed in the casing below the slide compartment; lamps in the lamp compartments cooperating with their respective slides; the indicia of the slides being of different character and means for lighting the lamps simultaneously with the projection of their respective slides; the lamps being of different colors to correspond with their respective indicia bearing slides.

6. In a signal as set forth in claim 5, said actuating means comprising circuits connected in parallel with the respective solenoids.

7. In a signal as set forth in claim 5, each slide having a recess in its lower edge to accommodate the lamp compartments, and having an extension at each lower corner engaging the guides to support the slide when projected.

BENJAMIN B. BEACH.